Figure 2:
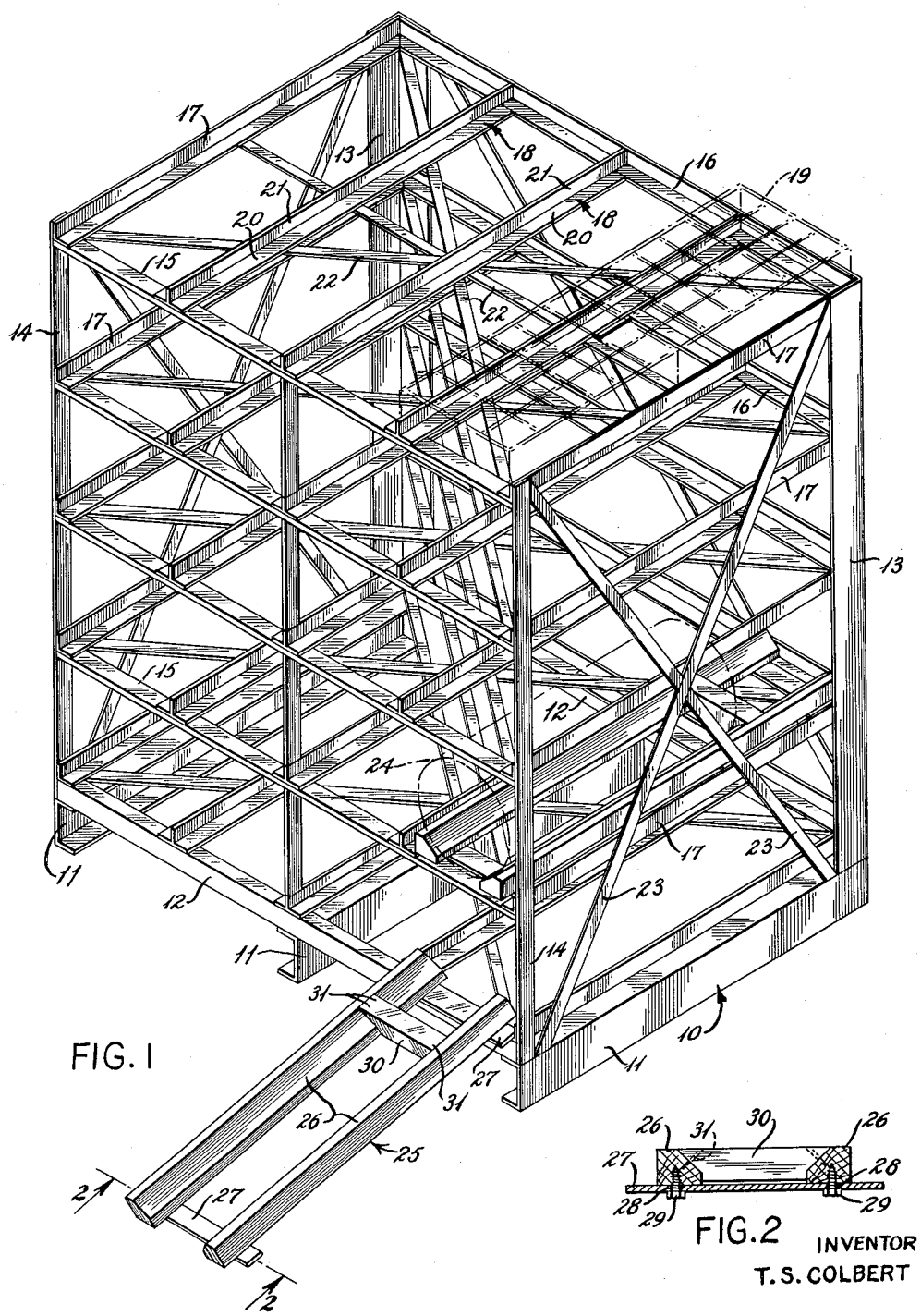

May 30, 1961 T. S. COLBERT 2,986,284
PORTABLE PALLET RACK
Filed June 18, 1959

FIG. I

INVENTOR
T. S. COLBERT

BY
ATTORNEY

United States Patent Office 2,986,284
Patented May 30, 1961

2,986,284
PORTABLE PALLET RACK
Thomas S. Colbert, 508 Minturn Ave., Hamlet, N.C.
Filed June 18, 1959, Ser. No. 821,129
2 Claims. (Cl. 211—134)

This invention relates to the distribution and transportation of various products and more particularly to equipment employed in the delivery of soft drinks in bottles and in bulk to a point of distribution.

The invention includes the provision of a portable pallet rack in which articles such as bottles and bulk delivery tanks may be easily stacked, transported and moved from a bottling plant to a retail outlet.

In the past, soft drinks have been dispensed from fountains and coin-operated machines in both bulk or liquid form as well as in bottles. In the bulk form the beverage has usually been prepared at the location by combining a syrup with carbonated water. However it has been found desirable to provide a pre-mixed ready-for-consumption beverage in order to obviate difficulties resulting from the handling and dispensing of the syrup and carbonated water.

In order to provide a carrier for the pre-mixed bulk beverage tanks holding a substantial quantity of the beverage have been provided for use at the retail outlets. This has necessitated the handling and transportation of bottles as well as the tanks and has presented a problem in view of the difficulty of handling and transporting crates of bottles and the tanks on the same delivery truck.

Heretofore, when a truck equipped to carry bottles attempted to carry tanks of pre-mixed beverages, the tanks were subject to bumping each other, bouncing off the truck or, when empty, being blown off the truck. Since these tanks are expensive and difficult to repair or replace, the cost to the bottler has been excessive. Also, it has not been profitable to equip a delivery truck exclusively for tanks, inasmuch as the distributors using the tank system have been widely spaced.

It is an object of the present invention to provide a pallet rack which will accommodate both cases of bottled beverages and tanks of pre-mixed beverages.

Another object is to provide a simple and inexpensive rack whereby either bottled beverage cases or pre-mixed beverage tanks or both may be carried on the same delivery truck.

A further object is to provide a pallet rack which may be loaded and stored in a bottling plant and which may be placed on a delivery truck for a particular route.

A still further object is to provide a cradle for holding a tank and preventing damage thereto.

Other objects and advantages will be apparent from the following description taken in conjunction with the accompanying drawing, wherein:

Fig. 1 is a perspective illustrating one embodiment of the present invention; and Fig. 2, a section on the line 2—2 of Fig. 1.

Briefly stated, the present invention comprises a portable pallet rack which may be mounted on or removed as a unit from the delivery truck and which is adapted to carry conventional cases of bottled beverages as well as tanks of pre-mixed beverages.

With continued reference to the drawing, the portable pallet rack comprises a base 10 formed of a plurality of channel members 11 connected at their upper ends by a pair of smaller channels 12 to provide a space for the tines of a fork lift truck (not shown). At the rear of the outer channel members 11 is provided a pair of large angle members 13 which extend upwardly to the desired height of the rack. At the front of each of the channels 11 an upright post or bar 14 is provided which extends upwardly to a height substantially equal to that of the angle members 13. The posts 14 are connected across the front of the rack by a series of flat straps or bars 15 and the angle members 13 are connected across the rear of the rack by a series of smaller angle members 16 disposed at substantially the same vertical position as the bars 15.

The angle members 13 and the posts 14 are connected by a series of side angle members 17 welded or otherwise attached thereto and connected to the front cross bars 15 and the rear angle members 16 to form a plurality of polygonal frames.

Intermediate each pair of side angles 17 and parallel thereto is provided a series of supporting members 18 having lower flanges 20 and vertical portions 21, which may be inverted T-bars or a pair of opposed angle members, in which the lower flanges extend in opposite directions. The supporting members 18 are spaced from each other and from the side members 17 a distance sufficient to accommodate a conventional case 19 of bottled beverage, and the distance between the front cross bars 15 is sufficient to accommodate either 6-ounce, 10-ounce or 12-ounce bottles, it being noted that a spacing large enough to accommodate a 12-ounce bottle will likewise accommodate a 6-ounce or 10-ounce bottle.

A plurality of braces 22 are provided beneath the side angle members 17 and support members 18 at each frame to give additional strength to the supports 18. Cross-bracing 23 is provided at the sides and rear of the rack to prevent the rack from twisting under a heavy load.

In order that cylindrical tanks 24 may be carried in the same rack, a cradle 25 is provided, having a pair of parallel side members 26 connected at each end by a bar 27 having openings 28 through which screws or other fastening means 29 securely attach bars 27 to the side members 26. Intermediate the ends of the cradle a stop 30 is provided, attached to the side members 26 by screws or other fasteners 31 and spaced from one end of the rack a distance slightly greater than the length of a tank to prevent the tank from sliding inwardly while being transported or loaded and unloaded.

In the operation of the portable pallet rack of the present invention, the rack may be loaded in the bottling plant with the desired assortment of bottled beverages and tanks of pre-mixed beverage to service a particular route. When the driver returns to the plant with the empty bottles and tanks, the racks containing the empty bottles and tanks are removed from the truck by a fork lift truck or by other suitable means. The racks which have been previously filled are then placed on the truck and the driver leaves almost immediately on another route. The time in which the truck is not in operation is reduced to a fraction of the time heretofore necessary to unload and load the truck. Each truck is capable of servicing both bottle and tank dispensers on a particular route and the possibility of damage to the bottles and tanks is greatly reduced.

The rack is preferably of a size to accommodate one tank and its cradle or two cases of bottles in end-to-end relation between each pair of support members.

It will be apparent that although one rack has been described and illustrated, racks of varying widths and heights may be constructed by merely adding or removing sections equal to the width of one or more conventional bottled beverage cases and heights corresponding to the bottles to be used.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. The combination of a portable pallet rack for bottled beverage cases and a cradle for a tank of beverage, said rack comprising a base, front and rear upright members connected to said base, a plurality of spaced substantially parallel front cross members connecting said front upright members, a plurality of spaced substantially parallel rear cross members connecting said rear upright members, a series of substantially parallel inverted T-shaped support bars connecting the front cross members to the rear cross members and being disposed to accommodate conventional bottled beverage cases, said support bars having flanges for horizontal support and vertical portions for lateral positioning of said cases, diagonal bracing means extending beneath the support bars and connected to the front and rear upright members, said cradle comprising a pair of side bars adapted to support a cylindrical tank and a pair of cross bars connecting the ends of said cradle side bars and of a length to be held between and carried by the support bars of said rack.

2. The invention as defined in claim 1, said base having spaced channel members of a height to permit the reception of the fork of a lift truck therebetween.

References Cited in the file of this patent

UNITED STATES PATENTS

| | | |
|---|---|---|
| 1,739,403 | Lundberg | Dec. 10, 1929 |
| 1,745,784 | Davis | Feb. 4, 1930 |
| 2,010,045 | Wells | Aug. 6, 1935 |
| 2,443,871 | Shield | June 22, 1948 |
| 2,598,800 | Kopper | June 3, 1952 |
| 2,624,470 | Geist | Jan. 6, 1953 |
| 2,815,130 | Franks | Dec. 3, 1957 |
| 2,875,902 | Ayars | Mar. 3, 1959 |

FOREIGN PATENTS

| | | |
|---|---|---|
| 1,111,088 | France | Oct. 26, 1955 |